United States Patent [19]

Nogawa

[11] Patent Number: 5,203,049
[45] Date of Patent: Apr. 20, 1993

[54] WIPER APPARATUS WITH MECHANISM FOR SWITCHING SPRAYING DIRECTION OF WASHING FLUID

[75] Inventor: Katsuhiko Nogawa, Yokohama, Japan

[73] Assignee: Jidosha Denki Kogyo Kabushiki Kaisha, Yokohama, Japan

[21] Appl. No.: 885,360

[22] Filed: May 19, 1992

[30] Foreign Application Priority Data

May 20, 1991 [JP] Japan .............................. 3-035511[U]
May 20, 1991 [JP] Japan .............................. 3-035518[U]

[51] Int. Cl.⁵ .......................... B60S 1/46; B60S 1/34
[52] U.S. Cl. ............................... 15/250.02; 15/250.04; 15/250.34; 239/284.1; 137/625.44
[58] Field of Search ........... 15/250.01, 250.02, 250.03, 15/250.04, 250 A, 250.34; 239/284.1, 284.2; 137/625.44

[56] References Cited

U.S. PATENT DOCUMENTS

| | | | |
|---|---|---|---|
| 2,286,933 | 6/1942 | Royal | 137/625.44 |
| 2,694,414 | 11/1954 | Seyferth | 137/625.44 |
| 2,835,916 | 5/1958 | Mittag et al. | 15/250.04 |
| 2,952,864 | 9/1960 | Nixon | 15/250.04 |
| 3,427,675 | 2/1969 | Tibbet | 15/250.02 |
| 4,922,570 | 5/1990 | Hirohama | 15/250.02 |

FOREIGN PATENT DOCUMENTS

| | | | |
|---|---|---|---|
| 1113877 | 9/1961 | Fed. Rep. of Germany | 15/250.04 |
| 0016228 | 2/1978 | Japan | 15/250.01 |
| 117956 | 9/1990 | Japan . | |
| 966176 | 8/1964 | United Kingdom | 15/250.04 |

Primary Examiner—Harvey C. Hornsby
Assistant Examiner—Gary K. Graham
Attorney, Agent, or Firm—Sughrue, Mion, Zinn, Macpeak & Seas

[57] ABSTRACT

A wiper apparatus is provided with a switching mechanism for spraying washing fluid in the leading direction of movement of a wiper blade at all times by actuating a valve synchronously with the oscillating movement of the wiper blade. The switching mechanism is composed mainly of a base member secured to the vehicle body and a casing member secured to the wiper arm which are disposed coaxially with a pivot shaft and coupled rotatably with each other to form a valve chest therebetween. A pair of valves attached to a disc member having an arcuate slot is disposed in the valve chest so as to alternately block ducts communicating with washer nozzles disposed on opposite sides of the wiper arm according to the engagement of opposite ends of the arcuate slot of the disc member with a contact piece on the base member every time the wiper blade arrives at the lower and the upper turning positions.

2 Claims, 6 Drawing Sheets

WIPER APPARATUS WITH MECHANISM FOR SWITCHING SPRAYING DIRECTION OF WASHING FLUID

BACKGROUND OF THE INVENTION

1. Field of the Invention

This invention relates to a wiper apparatus used for wiping a windshield of, for example, a motor vehicle with a wiper blade and, more particularly to a wiper apparatus provided with an improved switching mechanism for spraying washing fluid in the moving direction of the wiper blade swinging reciprocatively, at all times.

2. Description of the Prior Art

Heretofore, there has been used a wiper apparatus as shown in FIG. 5 and FIG. 6, which is disclosed in Japanese Utility Model Disclosure (KOKAI) No.2-117956/90.

In a wiper apparatus 20 shown in FIGS. 5 and 6, a pivot shaft 30 supported rotatably through a pivot holder 30a fixed to a vehicle body 50 is connected to a motor shaft 32a of a wiper motor 32 through a link 31 at the base end thereof, and connected with a base end of a wiper arm 34 fitted with a wiper blade 33 at the opposite end thereof.

The wiper arm 34 is provided with a first side washer nozzle 40 on the right side adjacent the opposite end thereof as viewed in FIG. 5, which is on the leading side when the wiper blade 33 moves toward the upper turning position B from the lower turning position A, and is provided with a second side washer nozzle 41 on the left side thereof as viewed in FIG. 5, which is the leading side when the wiper blade 33 moves toward the lower turning position A from the upper turning position B. The respective washer nozzles 40 and 41 are connected to a switching mechanism 36 shown in FIG. 6 through respective feed pipes 45 and 46 and the switching mechanism 36 is connected to a washer pump 43a of a reservoir 43 through a feed pipe 44.

The switching mechanism 36 is comprised mainly of a valve casing 36a formed interiorly with a fluid chamber 36a1 and a valve element 36a6, and is provided with a reservoir duct 36a2 communicating with the fluid chamber 36a1 on the upper face of the valve casing 36a and nozzle ducts 36a3, 36a4 communicating with the fluid chamber 36a1 on the upper side of the valve casing 36a in FIG. 5. The switching mechanism 36 is housed in the wiper arm 34 at the position spaced from the pivot shaft 30 as shown in FIG. 5.

The switching mechanism 36 is provided with the valve element 36a6 having a switching lever 36a5 protruding outwardly from the valve casing 36a at the center part of the fluid chamber 36a1, and so designed that the nozzle duct 36a3 or 36a4 may be blocked alternatively according to the movement of the valve element 36a6 around a valve shaft 36a7 by shifting the switching projection 36a5.

The nozzle ducts 36a3 and 36a4 are connected to ends of the feed pipes 45 and 46 respectively, and the opposite ends of the feed pipes 45 and 46 are connected to the first and second side washer nozzles 40 and 41, respectively. The feed pipe 44 is connected to the reservoir duct 36a2 on the upper side of the wiper arm 34 shown also in FIG. 6.

Furthermore, the pivot holder 30a is provided with switching projection 30a1 and 30a2 to contact with the switching lever 36a5 of the switching mechanism 36 at the time that the wiper blade 33 arrives at the lower turning position A and the upper turning position B, respectively, for switching over the valve element 36a6 alternatively when the wiper arm 34 swings reciprocatively together with the switching mechanism 36.

In the wiper apparatus 20 having the aforementioned structure, by actuating the wiper motor 32 according to the ON-operation of a wiper switch (not shown), the rotational movement of the motor shaft 32a is converted into the angularly oscillating movement of the pivot shaft 30 through the link 31, thereby swinging the wiper arm 34 reciprocatively. The windshield 35 is wiped between the lower turning position A and the upper turning position B with the wiper blade 33 pressed against the windshield 35 by elasticity of a spring disposed to the wiper arm 34.

In this state, by actuating the washer pump 43a of the reservoir 43 according to the ON-operation of a washer switch (not shown), the washing fluid stored in the reservoir 43 is fed to the fluid chamber 36a1 of the switching mechanism 36 through the feed pipe 44. When the valve element 36a6 in the fluid chamber 36a1 is rotated in the clockwise direction round the valve shaft 36a7 in FIG. 5 according to the contact of the switching lever 36a5 with the switching projection 30a1 when the wiper blade 33 arrives at the lower turning position A, and the nozzle duct 36a4 on the left side in FIG. 5 is blocked by the valve element 36a6 while the wiper blade 33 is moving toward the upper turning position B from the lower turning position A. Therefore, the washing fluid supplied to the fluid chamber 36a1 of the switching mechanism 36 from the reservoir 43 is fed into the first side washer nozzle 40 through the nozzle duct 36a3 and the feed pipe 45, and sprayed toward the windshield 35 in the leading direction of the wiper blade 33 through the first side washer nozzle 40.

Next, when the wiper blade 33 moves toward the upper turning position B from the lower turning position A and arrives at the upper turning position B, the switching lever 36a5 of the valve element 36a6 comes in contact with another switching projection 30a2 and the valve element 36a6 is rotated in the anticlockwise direction about the valve shaft 36a7 in FIG. 5, whereby the valve element 36a6 blocks the nozzle duct (going side duct) 36a3 so as to stop the spraying of the washing fluid through the first side washer nozzle 40 and opens the nozzle duct 36a4. Accordingly, the washing fluid supplied to the fluid chamber 36a1 of the switching mechanism 36 is fed into the second side washer nozzle 41 through the nozzle duct 36a4 and another feed pipe 46, and sprayed toward the windshield 35 in the leading direction of the wiper blade 33 moving to the lower turning position A from the upper turning position B through the second side washer nozzle 41.

Furthermore, when the wiper blade 33 moves toward the lower turning position A from the upper turning position B and arrives at the lower turning position A, the switching lever 36a5 comes in contact with the switching projection 30a1 and the valve element 36a6 blocks the nozzle duct 36a4 to stop the spraying of the washing fluid through the returning side washer nozzle 41 and opens the nozzle duct 36a3. In such a manner, the washing fluid is always sprayed in the leading direction of movement of the wiper blade 33 by switching the washer nozzle alternatively between the first side washer nozzle 40 and the second side washer nozzle 41.

However, in the aforementioned wiper apparatus 20, the reservoir duct 36a2 to be connected with the feed pipe 44 protrudes upwardly from the wiper arm 34, and the feed pipe 44 is so structured as to be exposed on the outside of the vehicle body 50 and is moved swingingly together with the reciprocative movement of the wiper arm 34. Therefore, there are problems in that an external view of the wiper apparatus 20 is spoiled by the feed pipe 44 and the feed pipe 44 can be easily damaged and/or disengaged from the reservoir duct 36a2 of the switching mechanism 36. The switching projections 30a1 and 30a2 for contacting the switching lever 36a5 are provided on the pivot holder 30a, but there is another problem since a wide space is required between the switching projections 30a1 and 30a2 in order to contact with the switching lever 36a5 of the switching mechanism 36 disposed away from the pivot shaft 30. Furthermore, there is a problem in that it requires much labor to repair or exchange the switching mechanism 36 since the switching mechanism 36 is disposed in the wiper arm 34 and it is necessary to detach the wiper arm 34 connected with the feed pipe 44. In addition to the above, there is a further problem in that timing adjustment for switching the spraying direction of the washing fluid is spoiled when foreign matter such as dust or the like collects between the switching projection 30a1 and 30a2.

SUMMARY OF THE INVENTION

This invention is made in view of the aforementioned problems of the Prior Art, and it is an object to provide a wiper apparatus which is excellent in the external view, easy to exchange the parts, hard to get out of order, and compact.

The construction of the wiper apparatus according to this invention in order to accomplish the above-mentioned object is characterized by comprising a pivot holder fixed on a vehicle, a pivot shaft supported rotatably by the pivot holder, a wiper arm secured to the pivot shaft for swinging reciprocatively over a windshield of the vehicle, a wiper blade attached to the wiper arm for wiping the windshield of the vehicle between a lower turning position and an upper turning position thereof, a first side washer nozzle for spraying washing fluid stored in a reservoir of the vehicle toward the windshield of the vehicle on the leading side of the wiper blade during movement in a first direction, a second side washer nozzle for spraying the washing fluid stored in the reservoir of the vehicle toward the windshield on the leading side of the wiper blade during movement in a second opposite direction, a switching mechanism for alternatively and switchingly supplying the washing fluid stored in the reservoir of the vehicle to one of the first and second side washer nozzles, which is on the leading side of the wiper arm, in accordance with the reciprocative movement of the wiper arm, and the switching mechanism is composed of a base member attached to the pivot holder coaxially with the pivot shaft and provided with a reservoir duct protruding on the inside of the vehicle and communicating with the reservoir of the vehicle, a casing member having a first side duct communicating with the first side washer nozzle and a second side duct communicating with the second side washer nozzle, secured to the wiper arm coaxially with the pivot shaft, and coupled rotatably with the base member to form a valve chest communicating with the first and second side ducts, and the reservoir duct of the base member, and a valve disposed in the valve chest for blocking the first side duct while the wiper blade is moving toward the lower turning position from the upper turning position and blocking the second side duct while the wiper blade is moving toward the upper turning position from the lower turning position. In the wiper apparatus according to this invention, it is preferable to attach the valve to a disc member, which is formed with an arcuate slot to be engaged with a contact piece provided to the base member and disposed between the base member and the casing member coaxially so as to move every time the wiper blade arrives at the upper and the lower turning positions according to engagement of the arcuate slot with the contact piece of the base member.

In the wiper apparatus according to this invention, the switching mechanism is composed mainly of the base member secured to the vehicle body and the casing member secured to the wiper arm, which are disposed coaxially to the pivot shaft and coupled rotatably with each other to form the valve chest therebetween. The casing member rotates relative to the base member secured to the vehicle body, in company with the wiper arm. The valve chest communicates with the first and the second side ducts and the reservoir duct protruding on the inside of the vehicle body. Therefore, the feed pipe connected to the reservoir duct is not exposed on the outside of the vehicle body, and is not damaged nor disengaged from the reservoir duct because the base member provided with the reservoir duct is secured to the vehicle body and the feed pipe does not move swingingly together with the wiper arm. It is easy to disassemble the switching mechanism in the casing member and the base member, and easy to detach the wiper arm from the switching mechanism and the pivot shaft, therefore the repair or the exchange of the parts such as the valve, the casing member and the like is facilitated. Furthermore, it becomes unnecessary to dispose the switching projection on the pivot holder by attaching the valve to the disc member provided with the arcuate slot to be engaged with the contact piece of the base member, therefore the wide space is not required to mount the wiper apparatus on the vehicle body and the switching mechanism functions accurately.

DESCRIPTION OF THE PREFERRED EMBODIMENT

An embodiment of the wiper apparatus according to this invention is shown in FIG. 1 to FIG. 4.

Figure 5:
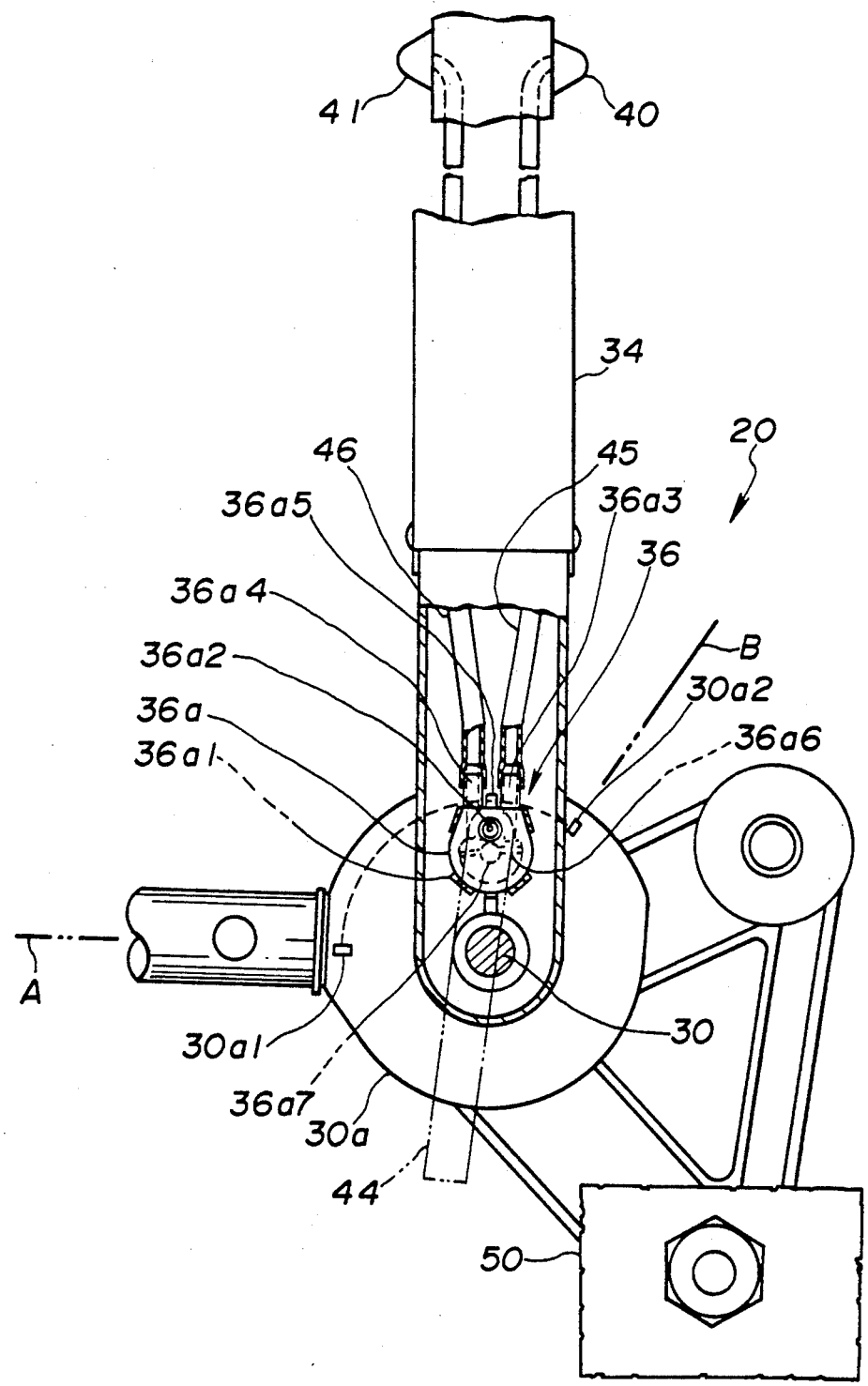
FIG. 5 is a partially sectional top plan view of a conventional wiper apparatus.

In a wiper apparatus shown in the figures, a pivot shaft 2 attached rotatably through a pivot holder 2a fixed to the vehicle body 50 is connected to the motor shaft 32a of the wiper motor 32 through the link 31 at the base end thereof as shown similarly in FIG. 5, and so designed as to be connected with a base end of a wiper arm 3 fitted with the wiper blade 33 on the opposite end thereof as described later.

Figure 6:
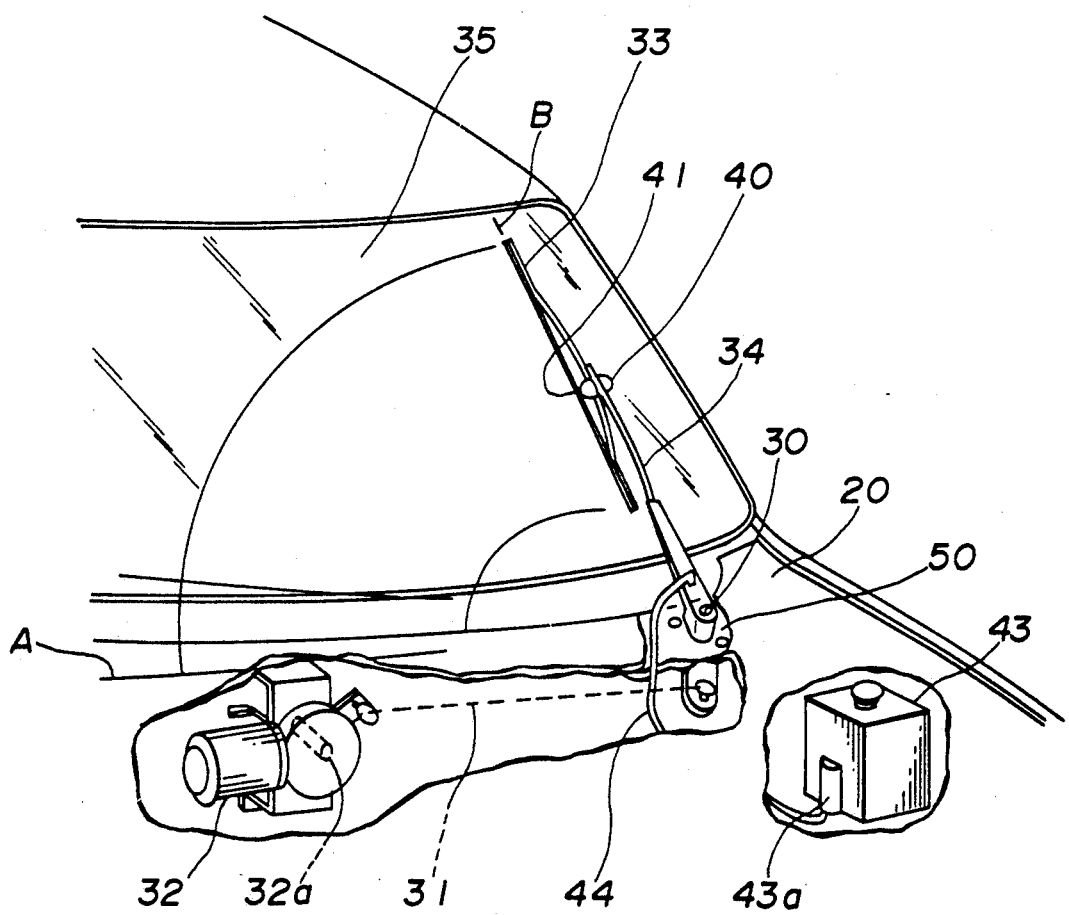
FIG. 6 is a perspective view of a vehicle mounted with the wiper apparatus shown in FIG. 5.

The wiper arm 3 is provided with a first side washer nozzle 40 (corresponding to the first side washer nozzle 40 shown in FIG. 5) adjacent the opposite end thereof on the side corresponding to the leading side when the wiper blade 33 moves toward the upper turning position B from the lower turning position A, and provided with a second side washer nozzle 41 (corresponding to the second side washer nozzle 41 shown in FIG. 5) on the side corresponding to the leading side when the wiper blade 33 moves toward the lower turning position A from the upper turning position B. The respective washer nozzles 40 and 41 are connected to a switching mechanism 4 through the feed pipes 45 and 46, respectively, and the switching mechanism 4 is connected to the washer pump 43a of the reservoir 43 through a feed pipe 11 as shown similarly in FIG. 6.

An arm head 3a, that is a part adjacent to the base end of the wiper arm 3 is provided with a shaft hole 3a1 receiving the pivot shaft 2, and formed with grooves 3a2 and 3a3 along the longitudinal direction of the wiper arm 3 on both side faces thereof adjacent to the shaft hole 3a1.

Figure 1:
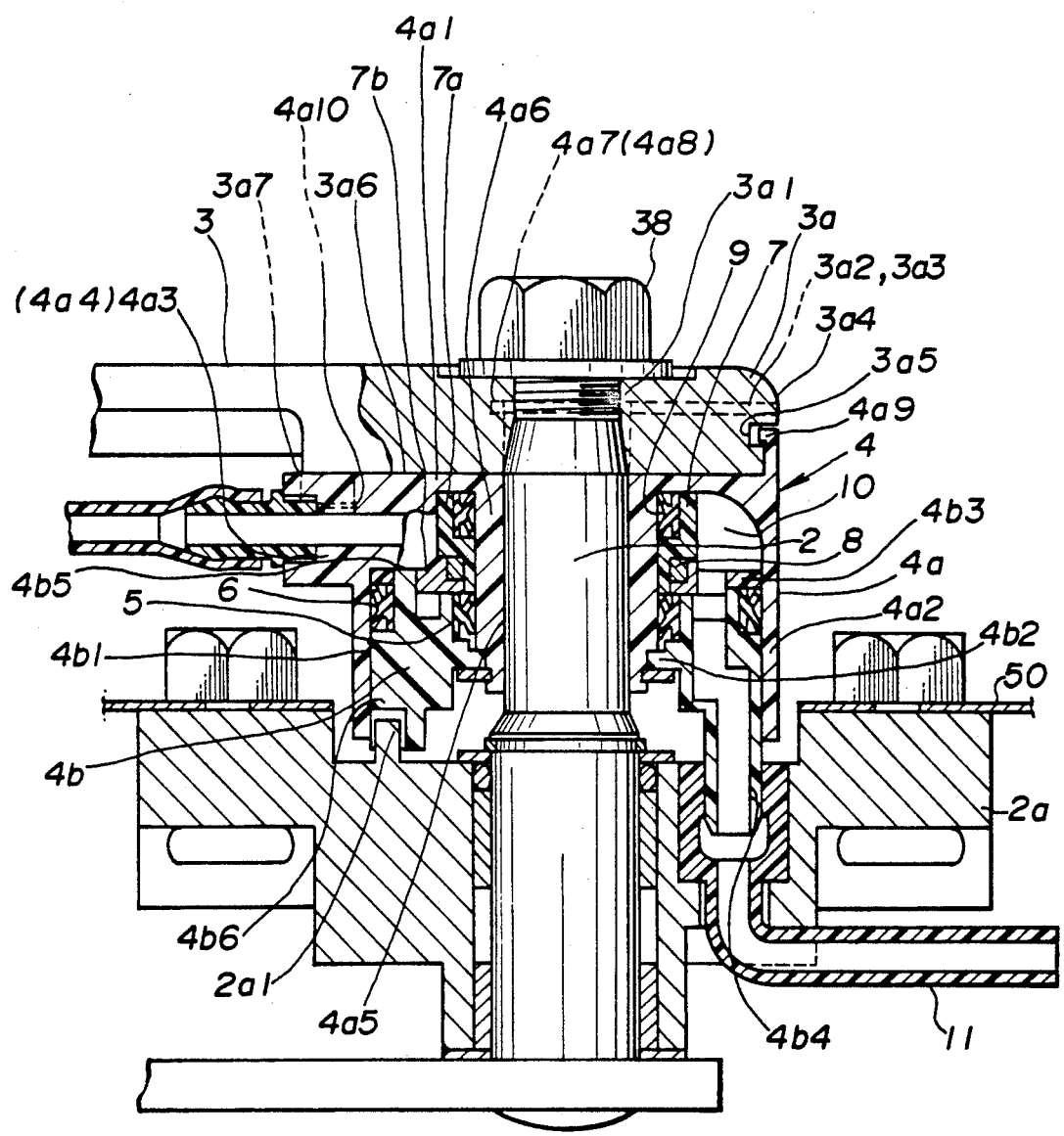
FIG. 1 is a vertical sectional front view illustrating an embodiment of the wiper apparatus according to this invention.

Furthermore, the arm head 3a is formed with another groove 3a5 parallel to a bottom face 3a6 on a base end face 3a4 which is at the right side end of the wiper arm 3 in FIG. 1 and provided with an L-shaped projection 3a7 protruding downwardly from the bottom face 3a6 thereof.

The switching mechanism 4 is composed mainly of a casing member 4a secured to the arm head 3a of the wiper arm 3 coaxially to the pivot shaft 2, and a base member 4b secured to the pivot holder 2a coaxially to the pivot shaft 2 and fitted rotatably into the casing member 4a.

The casing member 4a has a cylindrical side wall 4a2 and a upper wall 4a1 in contact with the bottom face 3a6 of the wiper arm 3, and is provided with a first side duct 4a3 and a second side duct 4a4 leading to the outside from the inside of the wall 4a2 on the left side under the upper wall 4a1 as shown in FIG. 1.

The casing member 4 is provided with a support 4a6 having a pivot hole 4a5 at the center of the upper wall 4a1, and so structured as to be supported to the pivot shaft 2 by passing the pivot shaft 2 through the pivot hole 4a5.

Figure 3:
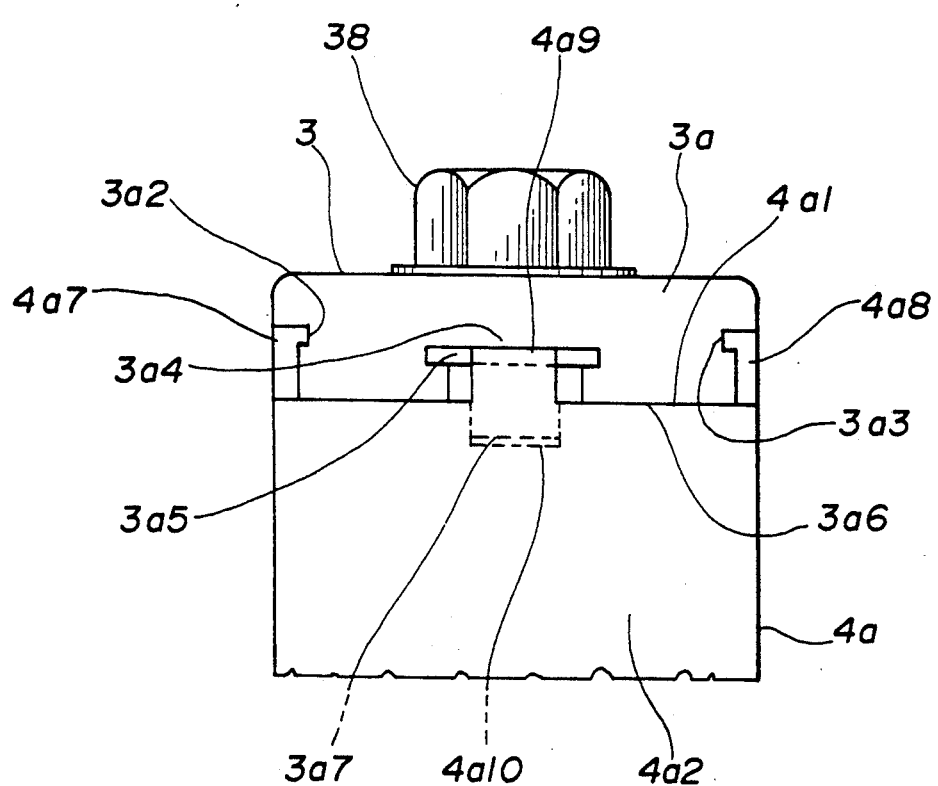
FIG. 3 is a right-side view of the wiper apparatus shown in FIG. 1.
Figure 4:
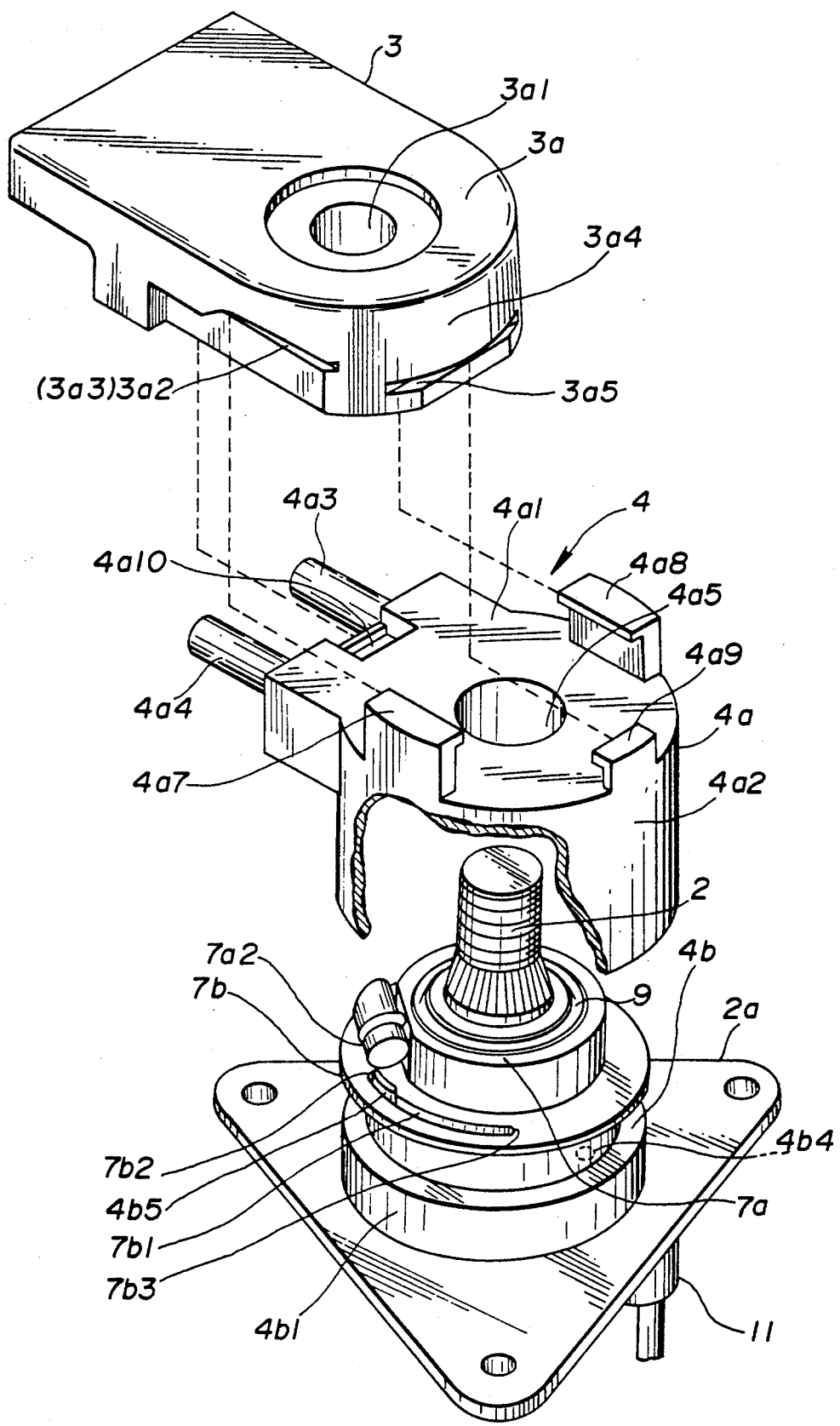
FIG. 4 is a perspective view illustrating assembling relationship of the wiper apparatus shown in FIG. 1.

Additionally, the casing member 4 is provided with inverted L-shaped projections 4a7 and 4a8 protruding upwardly from the opposite sides on the upper wall 4a1 as shown in FIG. 3 and FIG. 4, and the projections 4a7 and 4a8 are so structured as to be engaged with the grooves 3a2 and 3a3 of the wiper arm 3.

Furthermore, the casing member 4a is provided with another inverted L-shaped projection 4a9 protruding upwardly in the same manner as the aforementioned projections 4a7 and 4a8 from the rightward end of the upper wall 4a1 in FIG. 1, and the projection 4a9 is structured so as to match with the groove 3a5 formed on the base end face 3a4 of the wiper arm 3.

The casing member 4 is also formed with a rectangular shaped groove 4a10 on the left side of the upper wall 4a1 in FIG. 1 between the going and the returning side ducts 4a3 and 4a4 as shown also in FIG. 4, and the groove 4a10 is so designed as to match with the L-shaped projection 3a7 formed on the bottom face 3a6 of the wiper arm 3.

Namely, the casing member 4a is so designed as to be secure to the wiper arm 3 by fitting the projections 4a7, 4a8, 4a9 and 3a7 into the grooves 3a2, 3a3, 3a5 and 4a10, respectively.

On the other hand, the casing member 4a is fitted with a base member 4b on the inner side of the cylindrical side wall 4a2 on the lower side thereof in FIG. 1.

The base member 4b has a cylindrical-shaped peripheral wall 4b1 of which outer diameter is slightly smaller than the inner diameter of the cylindrical side wall 4a2 of the casing member 4a, is provided with a center hole 4b2 to be passed with the support 4a6 of the casing member 4a at the center thereof and a sealant 5 is disposed between the support 4a6 and the center hole 4b2 so that washer fluid may not leak between the both members.

The base member 4b is provided with a reservoir duct 4b4 leading from the upper face 4b3 to the lower side thereof on the right side of the base member 4 shown in FIG. 1, and is provided with a contact piece 4b5 projecting upwardly on the left side thereof shown in FIG. 1, as shown also in FIG. 4. The base member 4b is formed with a recess 4b6 on the lower side thereof in FIG. 1 for receiving a projection 2a1 provided on the upper face of the pivot holder 2a so as not to rotate the base member 4b about the pivot holder 2a when the base member 4b is attached to the pivot holder 2a.

In addition to above, another sealant 6 similar to the sealant 5 is disposed between the contact piece 4b5 and the cylindrical side wall 4a2 of the casing member 4a, and a disc member 7 is housed between the casing member 4a and the base member 4b.

The disc member 7 is composed of an inner ring 7a fitted rotatably onto the support 4a6 of the casing member 4a and an outer ring 7b fitted rigidly onto the inner ring 7a through an O-ring 8 as shown in FIG. 1.

Figure 2:
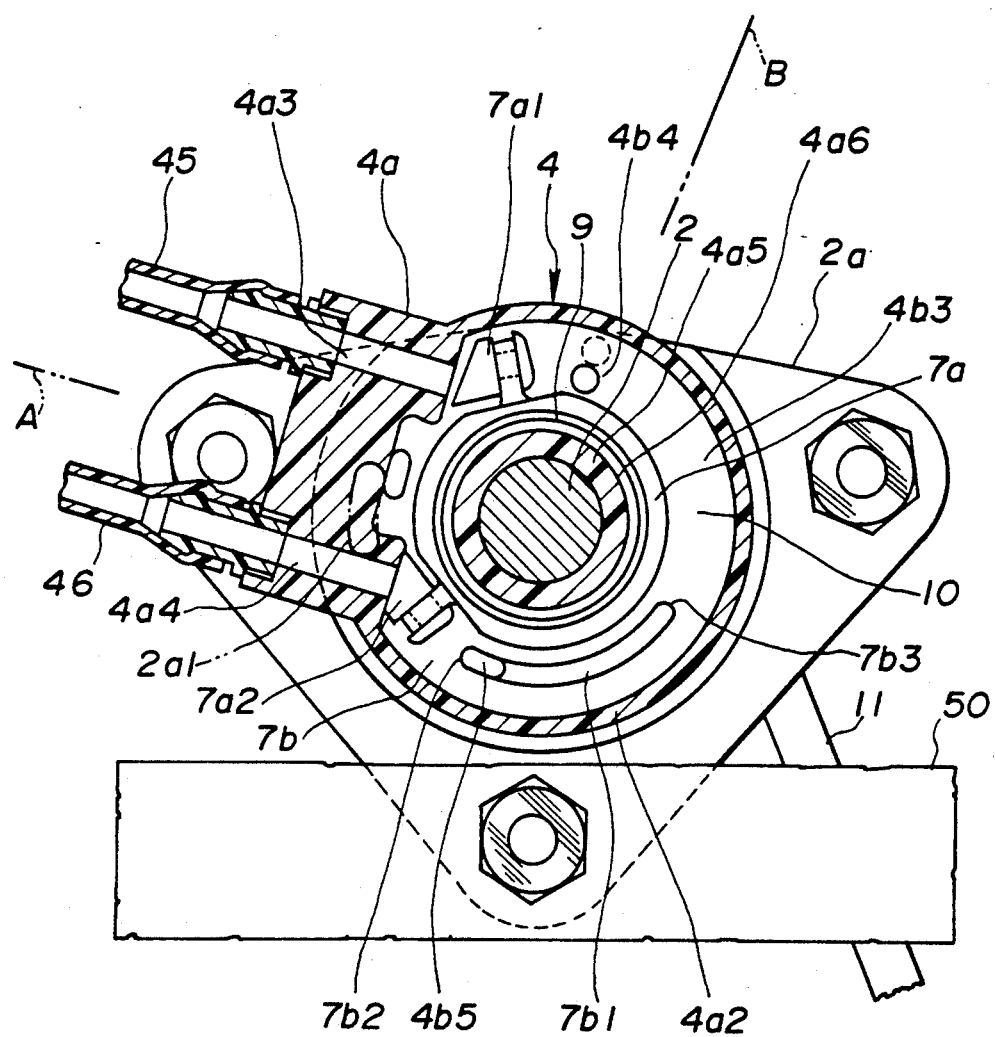
FIG. 2 is a horizontal sectional view of the wiper apparatus shown in FIG. 1.

A sealant 9 is disposed between the inner ring 7a of the disc member 7 and the support 4a6 of the casing member 4a as shown in FIG. 1, and the inner ring 7a is attached with valves 7a1 and 7a2 for blocking the going side duct 4a3 and the returning side duct 4a4 alternatively as shown in FIG. 2.

The outer ring 7b of the disc member 7 is provided with an arcuate slot 7b1 formed coaxially with the pivot shaft 2 for receiving the contact piece 4b5 provided to the base member 4b in order to change the spraying direction of the washer fluid by detecting the arrival of the wiper blade 33 at the upper and the lower turning positions A and B.

Namely, the disc member 7 moves rotationally in the anticlockwise direction in FIG. 2 concerning the base member 4b together with the casing member 4a according to the movement of the wiper arm 34 when the wiper blade 33 moves toward the lower turning position A from the upper turning position B, and is so structured as to block the second side duct 4a4 with the valve 7a2 by the engagement of an end 7b2 of the arcuate slot 7b1 with the contact piece 4b5 of the base member 4b fixed to the vehicle body 50 when the wiper blade 33 arrives at the lower turning position A. The disc member 7 moves rotationally in the clockwise direction in FIG. 2 together with the casing member 4a when the wiper blade 33 moves toward the upper turning position B from the lower turning position B, and is so structured as to block the first side duct 4a3 with the valve 7a1 by the engagement of another end 7b3 of the arcuate slot 7b1 with the contact piece 4b5 when the wiper blade 33 arrives at the upper turning position B.

By fitting the casing member 4a onto the base member 4b, a valve chest 10 is formed between the upper wall 4a1 of the casing member 4a and the base member 4b, which communicates with the reservoir duct 4b4 of the base member 4b, the first and the second side ducts 4a3, 4a4 of the casing member 4a. The watertightness of the valve chest 10 is maintained by the respective sealants 5, 6 and 9.

The first and the second side ducts 4a3 and 4a4 are connected with respective ends of the feed pipes 45 and 46, and the opposite ends of the feed pipes 45 and 46 are connected to the first side washer nozzle 40 and the second side washer nozzle 41, respectively.

The reservoir duct 4b4 protrudes downwardly from the bottom face of the base member 4b and is received in the reservoir duct receiving part 2a2 of the pivot holder 2a and communicates with the reservoir 43 through the feed pipe 11.

Then, as shown in FIG. 4, by sliding the wiper arm 3 on the upper wall 4a1 of the casing member 4a from the upper left side in FIG. 4, the projections 4a7, 4a8 and 4a9 of the casing member 4a is fitted into grooves 3a2, 3a3 and 3a5 of the wiper arm 3, and the projection 3a7 of the wiper arm 3 is fitted into the groove 4a10 of the casing 4a, whereby the casing member 4a of the switching mechanism 4 is attached to the wiper arm 3 and the pivot hole 4a5 of the casing member 4a coincides with the shaft hole 3a1 formed in the wiper arm 3.

In this state, the casing member 4a attached to the wiper arm 3 is fitted on the base member 4b disposed around the pivot shaft 2 at the same time of passing the pivot shaft 2 through the pivot hole 4a5 of the casing member 4a and the shaft hole 3a1 of the wiper arm 3, and the switching mechanism 4 is assembled and the wiper arm 3 is secured to the pivot shaft 2 rotatably together with the casing member 4a by tightening a nut 38 fitted on the top end of the pivot shaft 2 projecting out from the wiper arm 3.

In the wiper apparatus 1 having the aforementioned structure, by actuating the wiper motor 32 according to the ON-operation of a wiper switch (not shown), the rotational movement of the motor shaft 32a is converted into the angularly oscillating movement of the pivot shaft 2 through the link 31, thereby swinging the wiper arm 3 reciprocatively. The windshield 35 is wiped between the lower turning position A and the upper turning position B with the wiper blade 33 pressed against the windshield 35 by elasticity of a spring disposed to the wiper arm 3.

In this state, by actuating the washer pump 43a of the reservoir 43 according to the ON-operation of a washer switch (not shown), the washing fluid stored in the reservoir 43 is supplied to the valve chest 10 of the switching mechanism 4 through the feed pipe 11.

For example, the second side duct 4a4 is blocked by the valve 7a2 according to the engagement of the contact piece 4b5 with the end 7b2 of the arcuate slot 7b1 formed in the disc member 7 when the wiper blade 33 arrives at the lower turning position A. Therefore, the washing fluid supplied to the valve chest 10 from the reservoir 43 is fed into the first side washer nozzle 40 through the first side duct 4a3 and the feed pipe 45, and sprayed toward the windshield 35 in the leading direction of the wiper blade 33 through the first side washer nozzle 40 while the wiper blade 33 is moving toward the upper turning position B from the lower turning position A.

When the wiper blade 33 moves toward the upper turning position B from the lower turning position A and arrives at the upper turning position B, the first side duct 4a3 is blocked to stop the spraying of the washing fluid through the first side washer nozzle 40 by the valve 7a1 at the same time the second side duct 4a4 is opened according to the engagement of the contact piece 4b5 with the end 7b3 of the arcuate slot 7b1. Accordingly, the washing fluid supplied to the valve chest 10 is fed into the second side washer nozzle 41 through the second side duct 4a4 and the feed pipe 46, and sprayed toward the windshield 35 in the forward direction of the wiper blade 33 through the second side washer nozzle 41 while the wiper blade is moving toward the lower turning position A from the upper turning position B.

Furthermore, when the wiper blade 33 moves toward the lower turning position A from the upper turning position B and arrives at the lower turning position A, the contact piece 4b5 of the base member 4b secured to the vehicle body comes in contact with the end 7b2 of the arcuate slot 7b1 of the disc member 7, whereby the second side duct 4a4 is blocked again by the valve 7a2 and the first side duct 4a3 is opened. In such a manner, the washing fluid is sprayed in the leading direction of the wiper blade 33 at all times by switching the washer nozzle alternatively between the first side washer nozzle 40 and the second side washer nozzle 41.

In the wiper apparatus according to this invention, having the aforementioned structure, excellent effects can be obtained. Namely, it is possible to improve the external appearance of the wiper apparatus and possible to prevent the feed pipe from the disengagement or the breakage because the feed pipe communicating with the reservoir is connected on the inside of the vehicle body with the base member secured to the vehicle body and not exposed externally nor moved by the oscillating motion of the wiper arm. Also, it is easy to detach the wiper arm from the switching mechanism and the pivot shaft and a wide space is not required to mount the wiper apparatus on the vehicle body since the switching mechanism is separated into the casing member and the base member, which are disposed compactly around the pivot shaft and rotatably with each other. Furthermore, it is possible to switch accurately the spraying direction of the washing fluid because the position of the wiper blade is detected by the engagement of the contact piece and the arcuate slot, which are housed in the casing member of the switching mechanism.

What is claimed is:

1. A windshield wiping apparatus for a vehicle with a windshield, a washer pump and a reservoir containing washing fluid to be sprayed onto the windshield by the washer pump, said apparatus comprising:

a pivot holder fixed on the vehicle, said pivot holder having a reservoir duct receiving port communicating with the reservoir through a feed pipe;

a pivot shaft supported rotatably by said pivot holder;

a wiper arm having an end base secured to said pivot shaft for swinging reciprocatively over the windshield of the vehicle, the end base of said wiper arm having an end face with an elongated end groove therein and opposite side faces with a elongated side groove in each side face, said grooves being disposed orthogonally to an axis of said pivot shaft;

a wiper blade attached to said wiper arm for wiping the windshield of the vehicle between a lower turning position and an upper turning position thereof;

a first washer nozzle on said wiper arm for spraying a washing fluid stored in the reservoir toward the windshield of the vehicle on a leading side of said wiper blade during movement in a first direction;

a second washer nozzle on said wiper arm for spraying said washing fluid stored in the reservoir of the vehicle toward the windshield on a leading side of said wiper blade during movement in a second direction opposite to said first direction; and a fluid switching mechanism for alternatively supplying the washing fluid stored in the reservoir of the vehicle to one of said first and second washer nozzles, which is on the leading side of said wiper arm, in accordance with the reciprocative movement of the wiper arm;

a base member detachably attached to said pivot holder coaxially with the pivot shaft and provided with a reservoir duct communicating with said reservoir duct receiving port of said pivot holder;

a casing member including an upper wall having a cylindrical support with a pivot hole through which said pivot shaft extends and a side wall having a first duct and second duct in communication with said first washer nozzle and said second washer nozzle respectively, the upper wall having a pair of side projections engaged with the side grooves of said end base of said wiper arm and an end projection engaged with the end groove in the end base of said wiper arm, whereby said casing member is slidably and detachably engaged with said wiper arm, said casing member being coupled rotatably with said base member to form a valve chest communicating with the first duct, the second duct and the reservoir duct of said base member; and a valve means disposed in said valve chest composed of said base member and said casing member and having a first valve blocking the first duct while the wiper blade is moving in said first direction toward a lower turning position from an upper turning position and a second valve blocking the second duct while the wiper blade is moving in said second direction toward the upper turning position from the lower turning position.

2. A wiper apparatus as set forth in claim 1, wherein said valve means is attached to a disc member having an arcuate slot, said disc member being disposed between said base member and said casing member coaxially and movable with said casing member when said upper arm moves between the upper and lower turning positions and a contact piece on said base member extending into said slot whereby upon engagement of said contact piece with opposite ends of said slot when said upper arm reaches the upper and lower turning edges, said disc member will move relative to said casing member to move said first and second valves into and out of blocking engagement with said first and second ducts.

* * * * *